United States Patent
Fusz et al.

(10) Patent No.: US 8,438,072 B2
(45) Date of Patent: May 7, 2013

(54) ONLINE EXCHANGE SYSTEM AND METHOD WITH REVERSE AUCTION

(75) Inventors: Eugene A. Fusz, Palm Beach, FL (US); William Ross Fusz, Palm Beach, FL (US)

(73) Assignee: ConsumerCartel, LLC, Palm Beach, FL (US)

( * ) Notice: Subject to any disclaimer, the term of this patent is extended or adjusted under 35 U.S.C. 154(b) by 639 days.

(21) Appl. No.: 12/390,191

(22) Filed: Feb. 20, 2009

(65) Prior Publication Data

US 2010/0217680 A1  Aug. 26, 2010

(51) Int. Cl.
*G06Q 30/00*  (2006.01)

(52) U.S. Cl.
USPC .......... 705/26.3; 705/26.1; 705/27.1

(58) Field of Classification Search .......... 705/26.1, 705/27.1, 26.3
See application file for complete search history.

(56) References Cited

U.S. PATENT DOCUMENTS

| | | | |
|---|---|---|---|
| 4,412,287 A | 10/1983 | Braddock, III | |
| 4,799,156 A | 1/1989 | Shavit et al. | |
| 4,903,201 A | 2/1990 | Wagner | |
| 4,992,940 A | 2/1991 | Dworkin | |
| 5,136,501 A | 8/1992 | Silverman et al. | |
| 5,283,731 A | 2/1994 | Lalonde et al. | |
| 5,361,199 A | 11/1994 | Shoquist et al. | |
| 5,557,518 A | 9/1996 | Rosen | |
| 5,592,375 A | 1/1997 | Salmon et al. | |
| 5,694,551 A | 12/1997 | Doyle et al. | |
| 5,757,917 A | 5/1998 | Rose et al. | |
| 5,794,207 A * | 8/1998 | Walker et al. | 705/77 |
| 5,794,219 A | 8/1998 | Brown | |
| 5,835,896 A | 11/1998 | Fisher et al. | |
| 5,878,141 A | 3/1999 | Daly et al. | |
| 6,085,176 A | 7/2000 | Woolston | |
| 6,202,051 B1 | 3/2001 | Woolston | |
| 6,754,636 B1 * | 6/2004 | Walker et al. | 705/26 |
| 7,024,376 B1 * | 4/2006 | Yuen | 705/26.3 |
| 7,058,602 B1 * | 6/2006 | La Mura et al. | 705/37 |

(Continued)

OTHER PUBLICATIONS

Green, Darren, "And now for new tricks from veteran travel websites," Chicago Tribune, Feb. 13, 2005 (http://proquest.umi.com/pqdweb?did=792411231&sid=2&Fmt=3&clientId=19649&RQT=309&VName=PQD) [retrieved on Jul. 30, 2009].*

(Continued)

*Primary Examiner* — Jeffrey A Smith
*Assistant Examiner* — Anne Georgalas
(74) *Attorney, Agent, or Firm* — Armstrong Teasdale LLP

(57) ABSTRACT

A method of operating an online dynamic-bidding exchange for use in a reverse auction. The exchange includes a server system that includes a database, and a client system coupled to the server system via a communications network. The method includes determining a lowest credible price of a product, and receiving one or more offers to sell the product from a seller and storing the offers to sell in the database, wherein the offers to sell is embodied as a reserve price. The method also includes determining a sales price of the product based on a comparison of the lowest credible price and the competing reserve prices, transmitting the sales price from the server system to the client system, and displaying the sales price to a buyer via the client system.

28 Claims, 9 Drawing Sheets

U.S. PATENT DOCUMENTS

| | | | |
|---|---|---|---|
| 7,103,568 | B1 | 9/2006 | Fusz et al. |
| 7,133,835 | B1 | 11/2006 | Fusz et al. |
| 7,349,879 | B2 * | 3/2008 | Alsberg et al. ............. 705/37 |
| 7,584,124 | B2 * | 9/2009 | Porat et al. ............. 705/26.3 |
| 2002/0082978 | A1 * | 6/2002 | Ghouri et al. ............. 705/37 |
| 2002/0116317 | A1 | 8/2002 | May |
| 2002/0147674 | A1 | 10/2002 | Gillman |
| 2003/0172022 | A1 | 9/2003 | Coyne et al. |
| 2003/0208412 | A1 | 11/2003 | Hillestad et al. |
| 2005/0065853 | A1 * | 3/2005 | Ferreira ............. 705/26 |
| 2005/0216364 | A1 | 9/2005 | Jurisic et al. |
| 2006/0136322 | A1 | 6/2006 | Barry et al. |
| 2007/0136179 | A1 | 6/2007 | Nguyen |
| 2007/0244797 | A1 | 10/2007 | Hinson et al. |
| 2011/0040646 | A1 * | 2/2011 | Davis et al. ............. 705/26.3 |

OTHER PUBLICATIONS

Reed, Philip, "Negotiating 101," www.edmunds.com/advice/strategies/articles/45993/article.html, retrieved from www.archive.org from Oct. 12, 2007 [retrieved on Jul. 30, 2009].*

"Sears Price Matching Plus Policy/Price Protection Policy," www.sears.com/shc/s/nb_10153_12605_NB_CSpricematch?adCell=AF, retrieved from www.archive.org from Jan. 12, 2008 [retrieved on Jul. 29, 2009].* eBay, pages.ebay.com/help/buy, retrieved from www.archive.org from Oct. 11, 2007 [retrieved on Jul. 30-31, 2009].*

"Deals can be had using 'reverse auction' sites," by Ed Stansel, Florida Times Union [Jacksonville, Fla], Feb. 11, 2001: E4.*

* cited by examiner

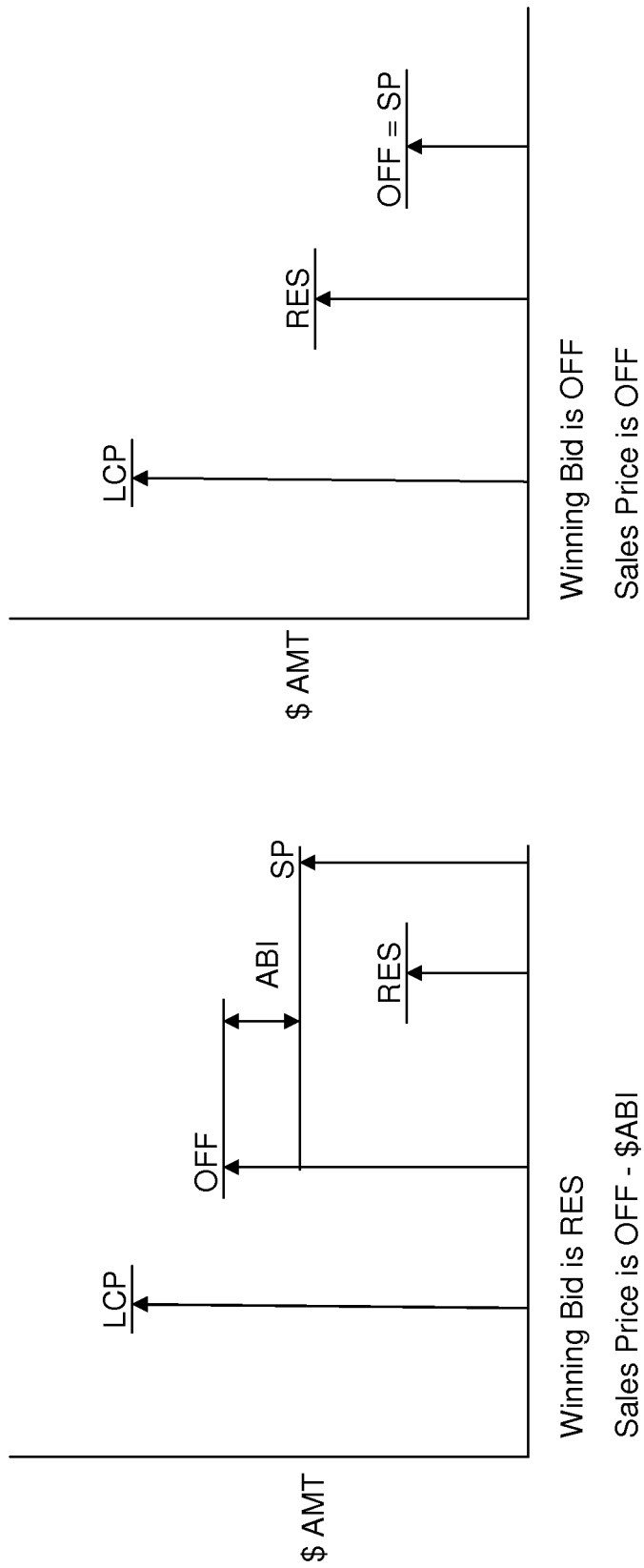

US 8,438,072 B2

ONLINE EXCHANGE SYSTEM AND METHOD WITH REVERSE AUCTION

BACKGROUND OF THE INVENTION

The embodiments described herein relate generally to purchasing products via an exchange system and, more particularly, to methods and systems for providing an online exchange system that facilitates a reverse auction using anonymous seller bids.

When wishing to purchase a product, many consumers spend a great amount of otherwise valuable time traveling to various merchandisers and/or browsing the Internet in order to compare prices. At least some known systems enable a consumer to search the Internet for a particular manufacturer or model of a product, and to manually compare returned prices. Moreover, at least some known systems enable consumers to bid for a particular product online. However, such systems do not allow for reverse auctions using anonymous seller bids for a product in order to provide lower prices to the consumer. In addition, such systems do not anticipate the constraints and/or motivations of buyers and sellers within the consumer product marketplace. Moreover, such systems do not enable consumers to join forces in order to form a cooperative group that encourages sellers to bid in advance in order to be a low cost provider of a product. Furthermore, such known systems do not enable sellers to obtain instantaneous information related to the marketplace, and to use that information to purchase product more cost effectively from manufacturers.

Accordingly, it is desirable to provide an online dynamic-bidding exchange for use in a reverse auction among anonymous sellers, in order to provide consumers with the lowest possible price of a product and requiring less travel and/or search time for the consumer. Moreover, it is desirable for such an exchange to provide potential buyers with quick offers for the sale of products at the lowest possible price, and to provide a specific offer to the potential buyers without the need to visit or make direct contact with the seller.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method of operating an online dynamic-bidding exchange is provided for use in a reverse auction. The exchange includes a server system that includes a database, and a client system coupled to the server system via a communications network. The method includes determining a lowest credible price of a product, and receiving an anonymous offer to sell the product from a seller and storing the offer to sell in the database, wherein the offer to sell is embodied as a reserve price. The method also includes determining a sales price of the product based on a comparison of the lowest credible price and the reserve price, transmitting the sales price from the server system to the client system, and displaying the sales price to a buyer via the client system.

In another aspect, a method of operating an online dynamic-bidding exchange is provided for use in a reverse auction. The exchange includes a server system that includes a database, and a client system coupled to the server system via a communications network. The method includes receiving a plurality of anonymous offers to sell the product from a plurality of sellers, wherein each offer to sell embodied as a respective reserve price. The method also includes storing the reserve prices in the database using the server system, determining a sales price of the product based on a comparison of the reserve prices, and displaying the sales price to a buyer via the client system.

In another aspect, a method of operating an online dynamic-bidding exchange is provided for use in a reverse auction. The exchange includes a server system that includes a database, and a client system coupled to the server system via a communications network. The method includes determining a lowest credible price of a product, storing the lowest credible price in the database, and receiving a plurality of offers to sell the product from a plurality of sellers, wherein each offer to sell embodied as a reserve price. The method also includes storing the reserve prices in the database, determining a sales price of the product based on a comparison of the lowest credible price and the reserve price, and transmitting the sales price to the client system responsive to a request for a price of the product.

In yet another aspect, a method of operating an online dynamic-bidding exchange is provided for use in a reverse auction. The exchange includes a server system that includes a database, and a client system coupled to the server system via a communications network, and the method includes determining a lowest credible price of a product, receiving a plurality of offers to sell the product from a plurality of sellers, storing the lowest credible price and the offers to sell in the database, determining a sales price of the product based on a comparison of the lowest credible price and the offers to sell, and displaying the sales price to a buyer.

In another aspect, a method of providing shipping agent service between a seller and a buyer is provided. The method uses a server system that includes a database, and a client system coupled to the server system via a communications network. The method includes receiving an offer to sell a product from the seller, receiving an acceptance of the offer to sell from the buyer, receiving payment from the buyer, transmitting the payment to the seller, and shipping the product to the buyer, by the seller.

BRIEF DESCRIPTION OF THE DRAWINGS

The embodiments described herein may be better understood by referring to the following description in conjunction with the accompanying drawings.

FIGS. 9A and 9B are graphs illustrating a comparison between a lowest credible price, one or more reserve prices received from sellers, and one or more offers to sell received from sellers.

DETAILED DESCRIPTION OF THE INVENTION

Figure 1:
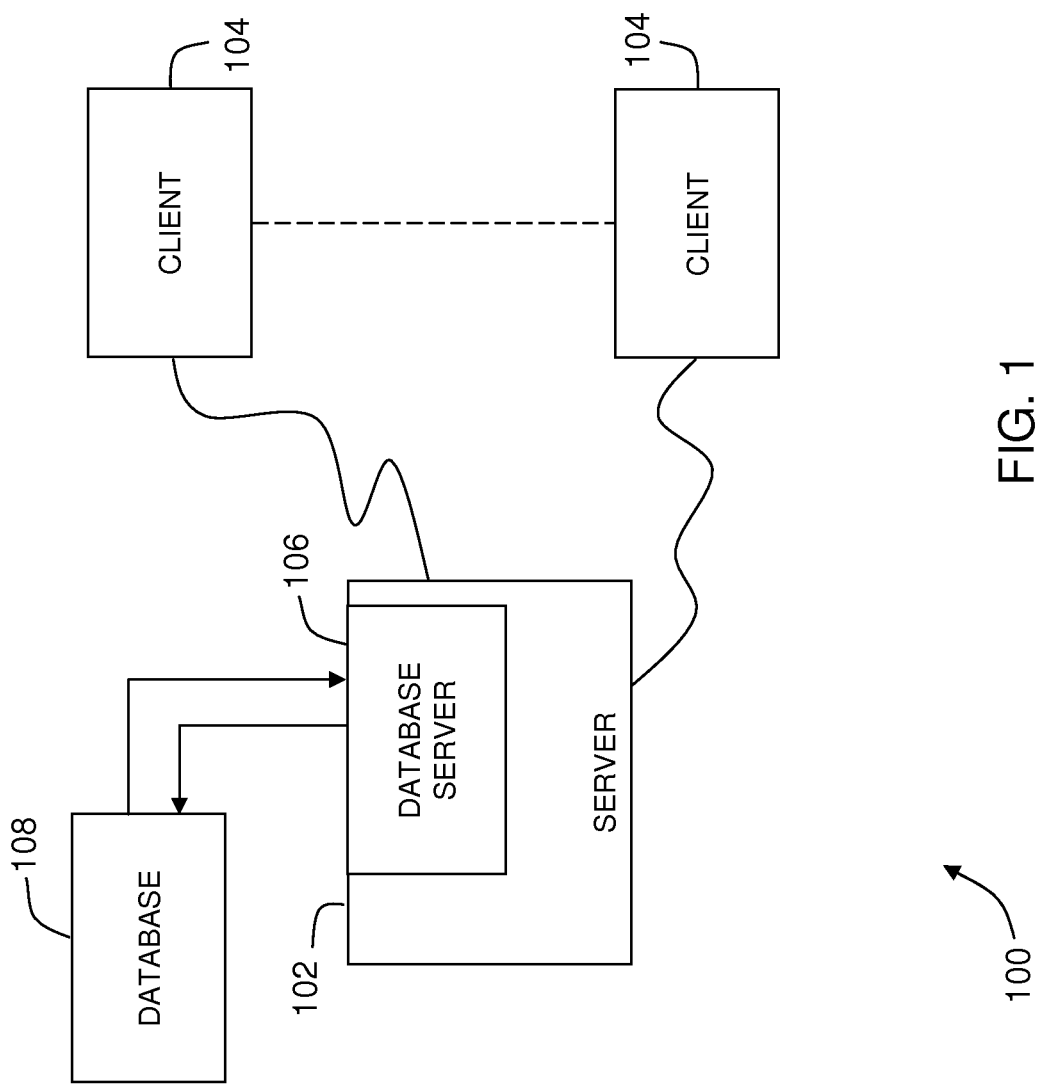
FIG. 1 is a simplified block diagram of an exemplary system for use in an online exchange for dynamic bidding between anonymous sellers.

In some embodiments, the term "lowest credible price" refers generally to a lowest price found for a particular product when using the Internet as a search vehicle. For example, as describe in greater detail below, an Internet search may be performed for a particular product, and each search result examined to determine a price being offered at a respective website. In some embodiments, rather than an Internet search, an observed price may be entered manually into the system.

In some embodiments, the term "offer to sell" refers generally to an offer by a seller to sell a product at a specified price. Such an offer may be modified during, for example, a bidding process. Moreover, in some embodiments, the term "reserve price" refers generally to a minimum price at which a seller is willing to sell a product. As such, as used herein, the term "offer to sell" refers to an offered sales price by a seller for a particular product, and the term "reserve price" refers to an offer to sell that is expressed as a lowest acceptable offer to sell sales price.

In some embodiments, the term "allowable bid increment" refers generally to an amount by which a bid must be advanced by a prospective buyer during an auction or by a prospective seller during a reverse auction. As described in greater detail below, an allowable bid increment may be a whole number, such as one dollar ($1), a partial amount, such as $2.50, or may vary depending on a sales price of the product. For example, an allowable bid increment may be a percentage of a sales price of a product.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Although described in connection with an exemplary online exchange, or dynamic bidding, environment, embodiments of the invention are operational with numerous other general purpose or special purpose computing system environments or configurations. The online exchange environment is not intended to suggest any limitation as to the scope of use or functionality of any aspect of the invention. Moreover, the online exchange environment should not be interpreted as having any dependency or requirement relating to any one or combination of components illustrated in the exemplary operating environment. Examples of well known online exchanges, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more controllers, computers, or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Technical effects of the methods, systems, and computers described herein include at least one of (a) entering a product record into a database, including product details such as a manufacturer, model, color, and the like; (b) determining a lowest credible price of a product; (c) associating the lowest credible price with the product record in the database; (d) receiving anonymous offers to sell the product from sellers, wherein each offer to sell may be embodied as an offer to sell or a reserve price; (e) associating the offers to sell with the product record in the database; (f) determining a sales price of the product based on the lowest credible price and/or the received offers to sell and reserve prices; (g) associating the sales price with the product record in the database; (h) enabling a buyer to search for the product using a web page; (i) displaying the sales price of the product to the buyer at a client machine such as a buyer workstation; (j) receiving an acceptance of the sales price from the buyer; (k) receiving payment for the product from the buyer; (l) submitting the payment for the product to the seller and placing an accompanying order for the product with the seller; and (m) facilitating shipment of the product by the seller to the buyer.

FIG. 1 is a simplified block diagram of an exemplary system 100 in accordance with one embodiment. In the exemplary embodiment, system 100 includes a server system 102, and a plurality of client sub-systems, also referred to as client systems 104, connected to server system 102. In one embodiment, client systems 104 are computers including a web browser and/or a client software application, such that server system 102 is accessible to client systems 104 over a network, such as the Internet and/or an intranet. Client systems 104 are interconnected to the Internet through many interfaces including a network, such as a local area network (LAN), a wide area network (WAN), dial-in-connections, cable modems, wireless modems, and/or special high-speed Integrated Services Digital Network (ISDN) lines. As described above, client systems 104 may be any device capable of interconnecting to the Internet including a computer, web-based phone, personal digital assistant (PDA), or other web-based connectable equipment. A database server 106 is connected to a database 108 containing information on a variety of matters, such as data related to facilitating an online product exchange that enables an operator to match purchase requests with offers to sell. In one embodiment, centralized database 108 is stored on server system 102 and is accessed by potential users at one of client systems 104 by logging onto server system 102 through one of client systems 104. In an alternative embodiment, database 108 is stored remotely from server system 102 and may be non-centralized.

As discussed below, database 108 may contain buyer profiles, seller profiles, product profiles, and/or exchange configuration information. A buyer profile may include, but is not limited to only including, a buyer identifier such as user name, a password, contact information, mailing information, billing information, saved product searches, and/or user preferences for use in searching database 108 and/or displaying product searches via client system 104. A seller profile may include, for example, seller identifier such as a user name, a password, contact information, mailing and/or shipping information, billing and/or invoicing information, and/or offer information. In some embodiments, offer information includes only an offer to sell at a designated price as specified by a seller. In some other embodiments, offer information includes a reserve price designated by a seller.

The embodiments illustrated and described herein as well as embodiments not specifically described herein but within the scope of aspects of the invention constitute exemplary means for conducting an online exchange for use in dynamic bidding between anonymous sellers, and more particularly, constitute exemplary means for matching purchase requests with offers to sell. For example, server system 102 or client system 104, or any other similar computer device, programmed with computer-executable instructions illustrated in FIG. 1 constitutes exemplary means for conducting an online exchange for use in dynamic bidding between anonymous sellers.

Figure 2:
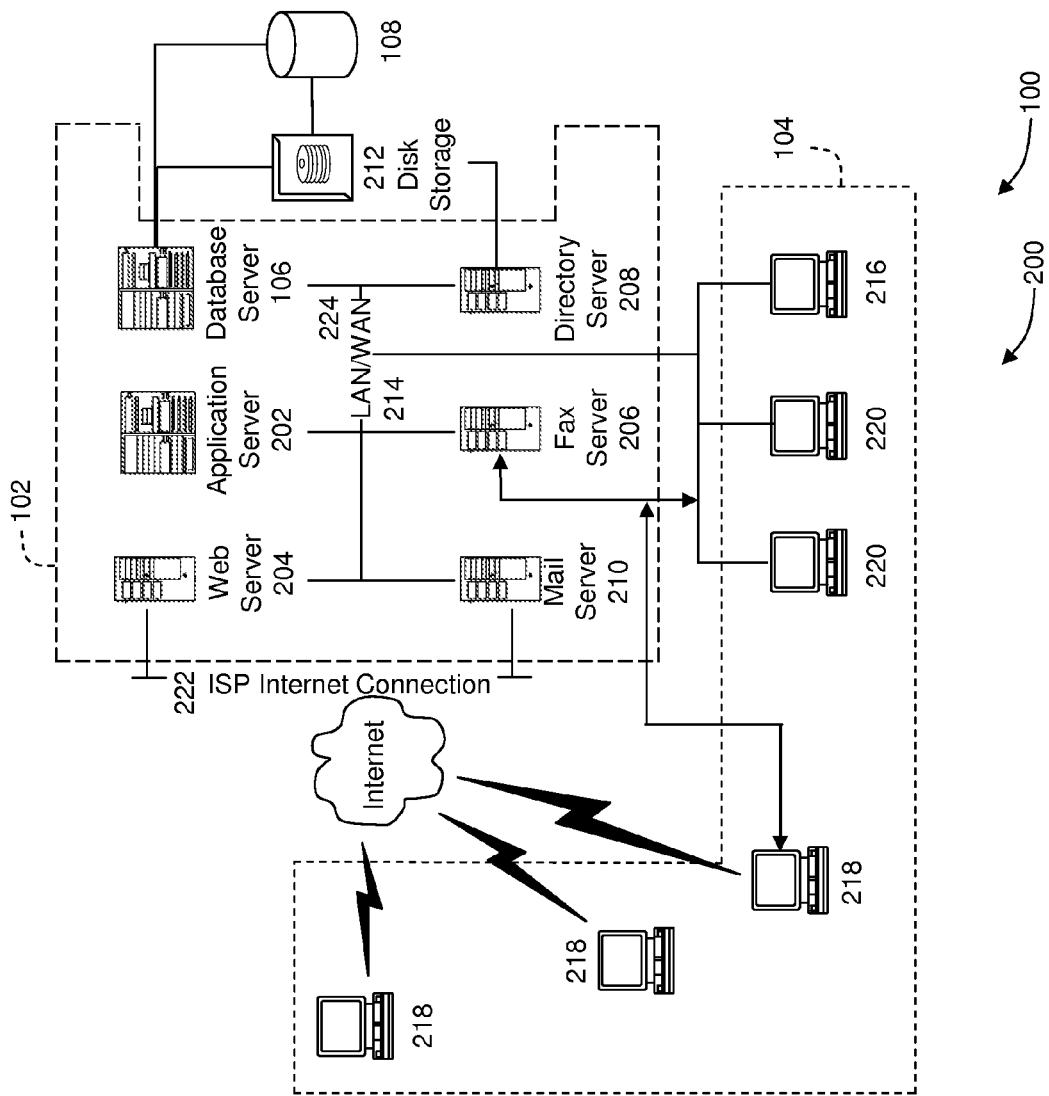
FIG. 2 is an expanded block diagram of an exemplary embodiment of a system architecture of the system shown in FIG. 1.

FIG. 2 is an expanded block diagram of an exemplary embodiment of a system architecture 200 of system 100 (shown in FIG. 1) in accordance with one embodiment. Components in system architecture 200, identical to components of system 100, are identified in FIG. 2 using the same reference numerals as used in FIG. 1. System 200 includes server system 102 and client systems 104. Server system 102 further includes database server 106, an application server 202, a web server 204, a fax server 206, a directory server 208, and a mail server 210. A disk storage unit 212 is coupled to database server 106 and directory server 208. Examples of disk storage unit 212 include, but are not limited to including, a Network Attached Storage (NAS) device and a Storage Area Network (SAN) device. Database server 106 is also coupled to database 108. Servers 106, 202, 204, 206, 208, and 210 are coupled in a local area network (LAN) 214. Client systems 104 may include a system administrator workstation 216, a number of buyer workstations 218, and a number of seller workstations 220 coupled to LAN 214.

Each client system 104, including workstations 216, 218, and 220, is a personal computer having a web browser and/or a client application. Server system 102 is configured to be communicatively coupled to client systems 104 to enable server system 102 to be accessed using an Internet connection 222 provided by an Internet Service Provider (ISP). The communication in the exemplary embodiment is illustrated as being performed using the Internet, however, any suitable wide area network (WAN) type communication can be utilized in alternative embodiments, that is, the systems and processes are not limited to being practiced using the Internet. In addition, local area network 214 may be used in place of WAN 224. Further, fax server 206 may communicate with remotely located client systems 104 using a telephone link.

Figure 3:
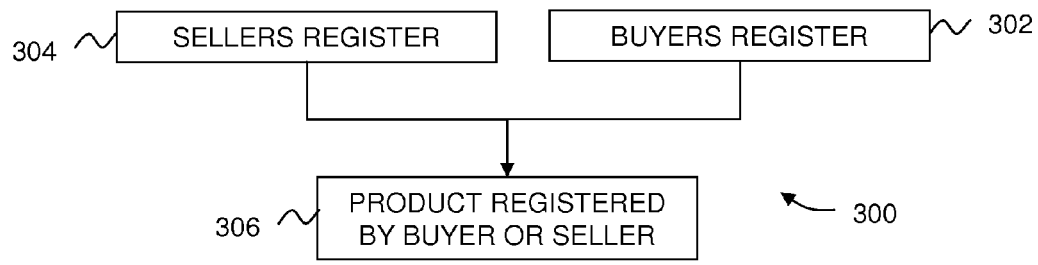
FIG. 3 is a simplified flowchart illustrating a method of setting up the online exchange system shown in FIG. 2 for facilitating dynamic, anonymous bidding by a plurality of sellers.

FIG. 3 is a simplified flowchart 300 illustrating a method of setting up an online exchange system, such as system 200 (shown in FIG. 2) for facilitating dynamic, anonymous bidding by a plurality of sellers. A number of buyers register 302 with system 200 in order to search for a desired product, purchase products, and/or enter a lowest credible price for a particular product that a buyer has observed, whether via the Internet or in a physical store location. Moreover, a number of sellers register 304 with system 200 in order to load product information into system 200, and/or to enter an offer to sell and/or a reserve price for a product. A system administrator may then register 306 a product with system 200 by entering product information such as a model number, a manufacturer, a color, or other characteristics. In some embodiments, buyers and/or sellers may also register a product with system 200. Moreover, in some embodiments, the product information may be included in a pre-packaged, searchable database that is obtained and/or utilized by the seller. It will be understood that the steps described above may be completed in an order that is different than the above order.

Figure 4:
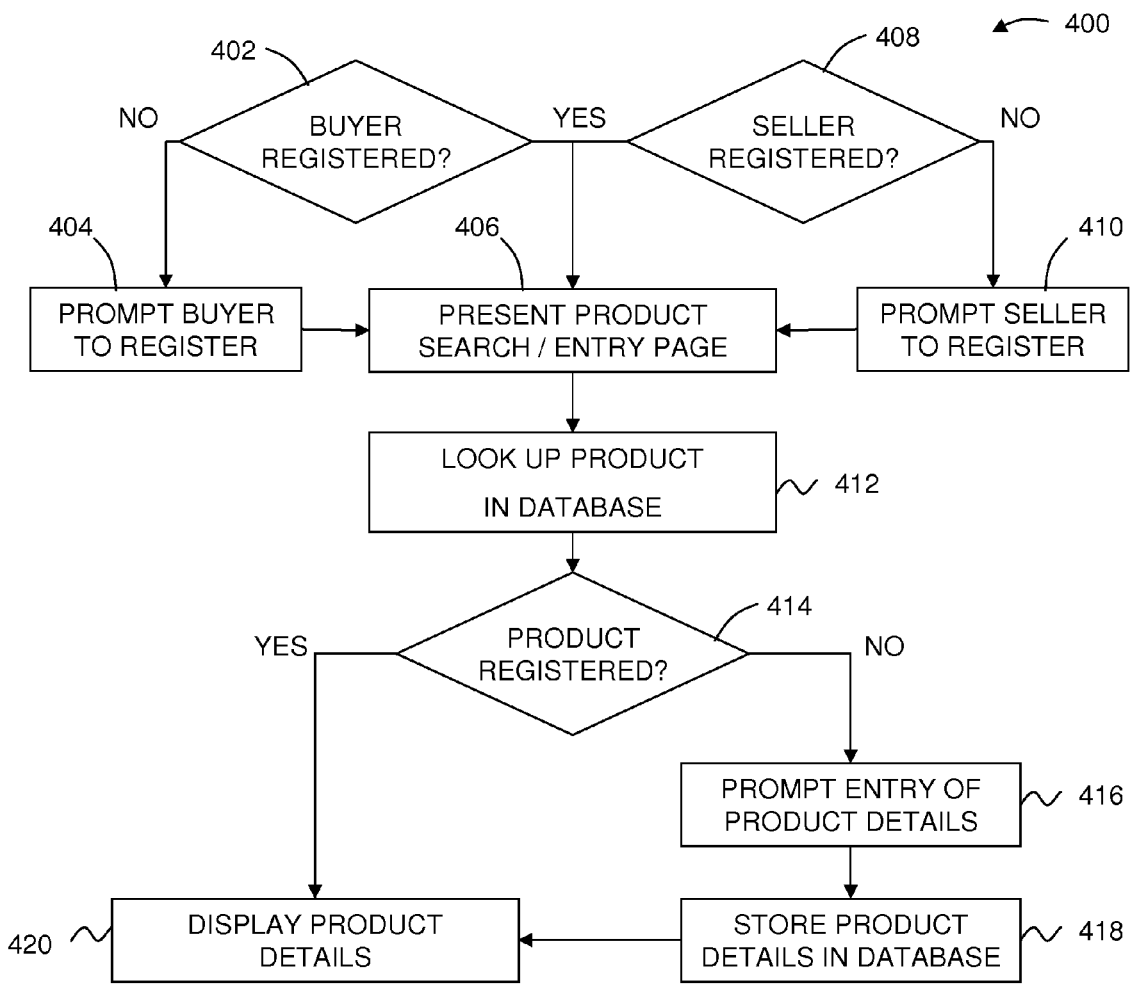
FIG. 4 is an expanded flowchart that further illustrates the method shown in FIG. 3.

FIG. 4 is an expanded flowchart 400 that further illustrates the method shown in FIG. 3. When a buyer accesses system 200 (shown in FIG. 2) using, for example, buyer workstation 218 (shown in FIG. 2), server system 102 (shown in FIGS. 1 and 2) determines 402 whether the buyer is registered with system 200. Upon a determination that the buyer is not registered with system 200, the buyer is prompted to register 404 with system 200. During registration, the buyer provides, for example, a name and contact information, such as an email address, a residential address, a work address, a phone number, and/or payment or banking information. The buyer may also provide a user identifier (ID) and a password. Upon receiving a determination that the buyer is registered with system 200 or, alternatively, upon registering 404 with system 200, server system 102 presents 406 the buyer with a product search tool that enables the buyer to search for a desired product using filterable fields including, but not limited to, manufacturer, model, color, etc. The server system 102 also enables the buyer to enter product information as described further below.

Similarly, when a seller accesses system 200 using, for example, seller workstation 200 (shown in FIG. 2), server system 102 determines 408 whether the seller is registered with system 200. Upon a determination that the seller is not registered with system 200, the seller is prompted to register 410 with system 200. During registration, the seller provides, for example, a name and contact information, such as an email address, web page URL, a business address, a phone number, a fax number, shipping information, and/or payment information. The seller may also provide a user identifier (ID) and a password. Upon receiving a determined that the seller is registered with system 200 or, alternatively, upon registering 410 with system 200, server system 102 presents 406 the seller with a product search tool that enables the seller to search for a product and/or create a product profile as described below.

An administrator of system 200 or, alternatively, any buyer or seller that has registered with system 200 as described above may wish to create a new product profile for a particular product. As such, a buyer or seller enters 412 or looks up the product in a database, such as database 108 (shown in FIGS. 1 and 2), of system 200. In so doing, the buyer or seller enters resource data into system 200 to identify the product. Server system 102 compares the entered data to data already stored in database 108 to determine 414 whether the product was previously added to system 200. Examples of the product data includes a manufacturer of the product, a model of the product, and/or a general description of the product. If the product as described by the buyer or seller is not detected within system 200, the buyer or seller is prompted to enter 416 a full description of the product. Server system 102 may be configured to implement string matching such that if server system 102 detects that the entered product data does not exactly match product data already stored in database 108, server system 102 may be configured to prompt the buyer or seller to change an entered value. When the data relating to the new product is entered, server system 102 stores 418 the product information in database 108 and identifies the product using a product identifier. In one embodiment, product data may also be entered by an administrator of system 200 using, for example administration workstation 216. If the product has already been entered into system 200, the product information is displayed 420 to the buyer or seller. In an alternative embodiment, database 108 may include predetermined product information that is compiled by an outside source for use by system 200.

Figure 5:
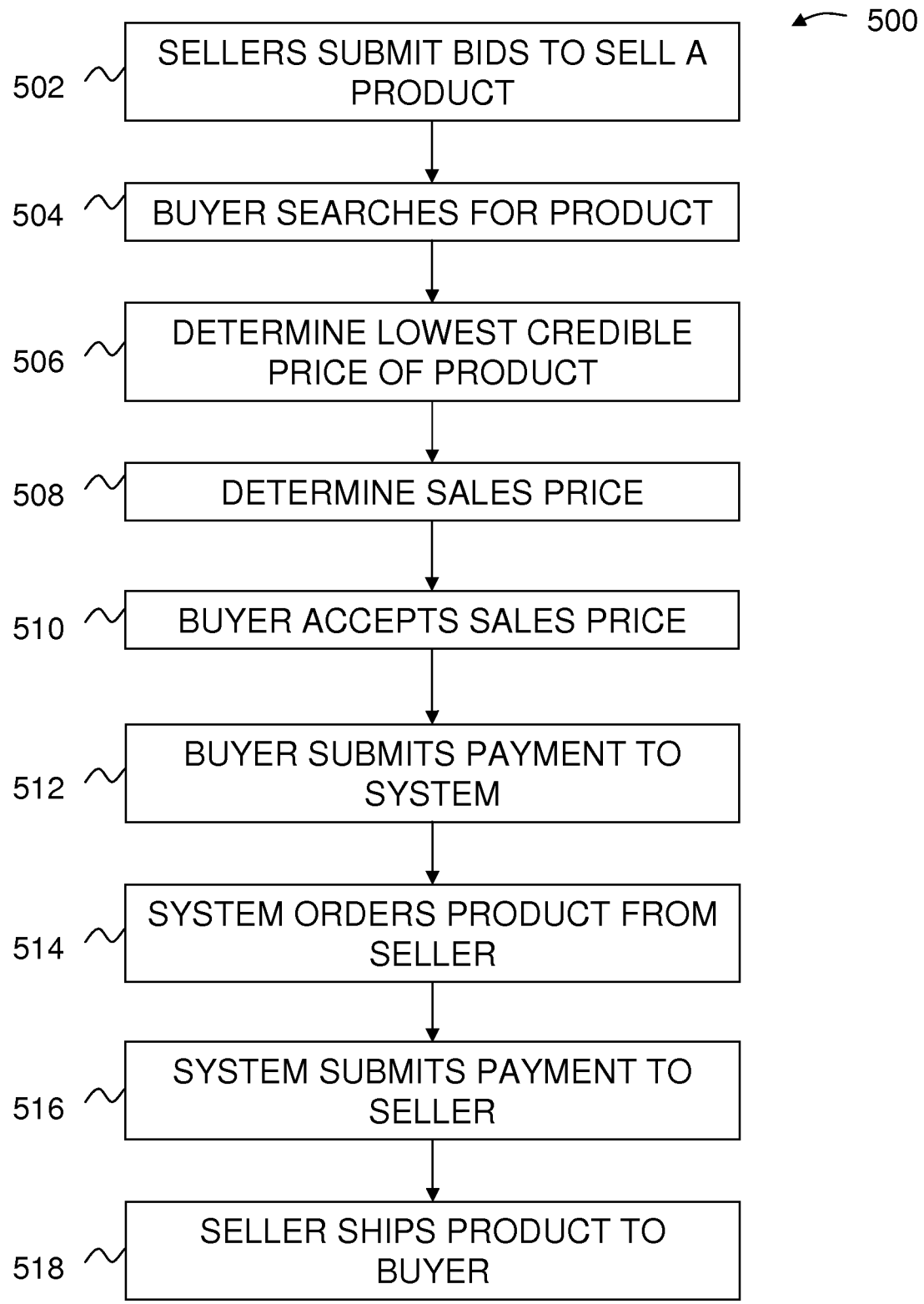
FIG. 5 is a simplified flowchart illustrating a method of operating the online exchange system shown in FIG. 2 for facilitating dynamic, anonymous bidding by a plurality of sellers.

FIG. 5 is a simplified flowchart 500 illustrating a method of operating an online exchange system, such as system 200 (shown in FIG. 2) for facilitating dynamic, anonymous bidding by a plurality of sellers. After a product is registered with system 200, a number of sellers enter 502 bids to sell the product as offers to sell and/or reserve. In some embodiments, the bids are anonymous such that the identity of each seller is not displayed to a buyer. When a buyer logs into, for example, a web page of system 200 and searches 504 for a desired product, the product is displayed to the buyer along with the sales price. A lowest credible price is then determined 506 for the product. In some embodiments, the lowest credible price is determined automatically for each product by system 200. For example, system 200 may automatically search the Internet for a lowest advertised price for a particular product. Alternatively, a system administrator, a buyer, or a seller may enter the lowest credible price for a product into system 200. The lowest credible price is then saved to system 200. The lowest credible price, offers to sell, and/or reserve prices are compared in order to determine 508 a winning bid and the offer to sell or reserve price associated with the winning bid, and a sales price for the product is then set by system 200 equal to the offer to sell or reserve price of the winning bid. If the buyer finds the sales price acceptable, the buyer accepts 510 the sales price offer. The buyer then submits 512 payment of the sales price to system 200. System 200 deducts a transaction fee from the payment and then orders 514 the product from the seller and submits 516 payment of the sales price, less the transaction fee, to the seller associated with the winning bid. The seller then ships 518 the product to the buyer. It will be understood that the steps described above may be completed in an order that is different than the above order.

Figure 6:
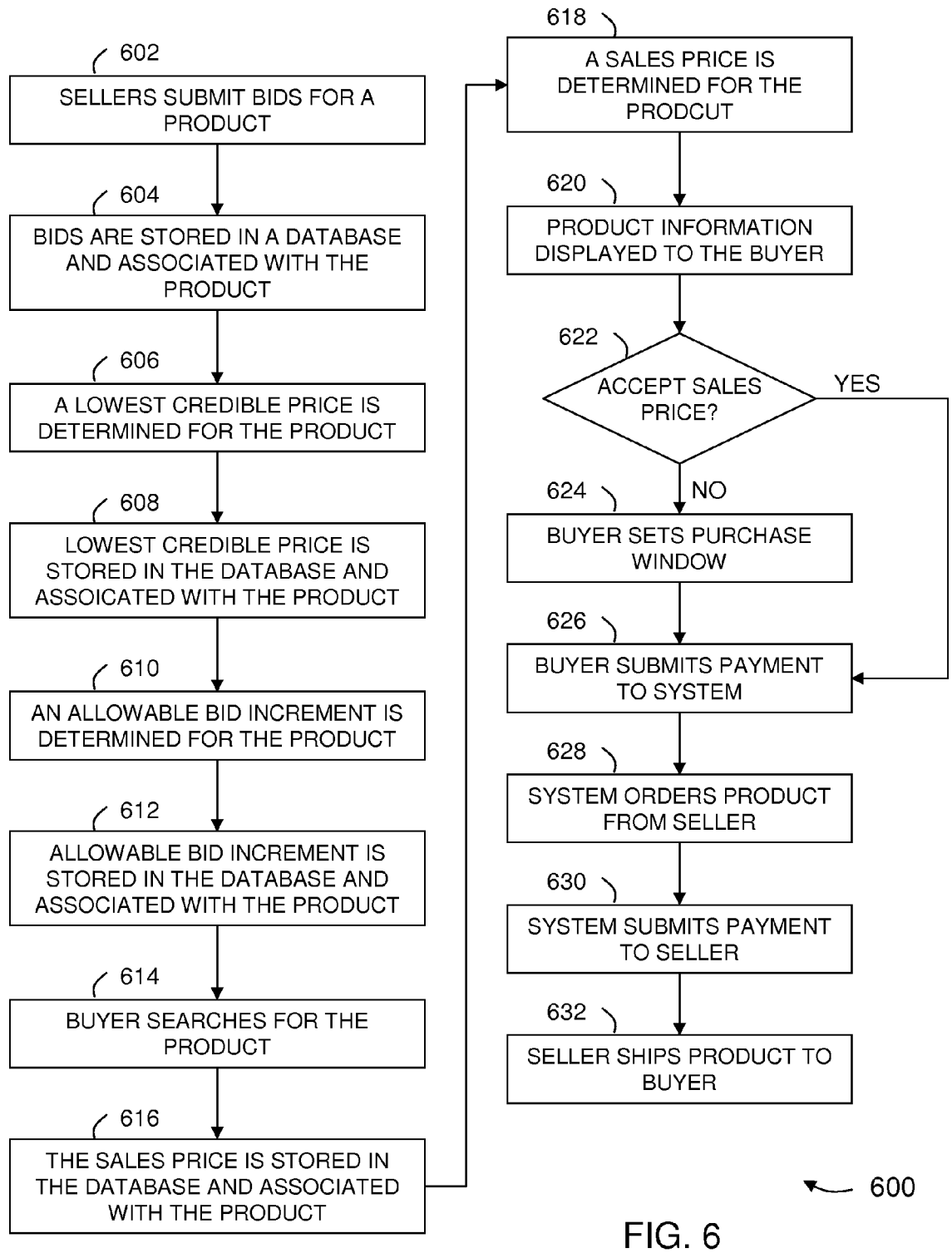
FIG. 6 is an expanded flowchart that further illustrates the method shown in FIG. 5.

FIG. 6 is an expanded flowchart 600 that further illustrates the method shown in FIG. 5. Each seller that wishes to enter a sales bid for a particular product submits 602 a bid in the form of a reserve price for the product. In some embodiments, system 200 (shown in FIG. 2) limits sellers from duplicating previously submitted reserve prices. In such an embodiment, when a seller submits a reserve price that has already been submitted, system 200 displays a notification to the seller using, for example, a web page, that informs the seller that the reserve price has already been submitted and requests that the seller submit a different reserve price. Moreover, in some embodiments, each seller is capable of displaying at seller workstation 218 (shown in FIG. 2) any previously entered bids and/or a quantity of the product available. Each reserve price that is received by system 200 is stored 604 in database 108 and associated with a product ID.

Next, system 200 determines 606 a lowest credible price of the product. In some embodiments, server system 102 (shown in FIGS. 1 and 2) conducts a web-based search over the Internet in order to determine the lowest credible price. Such a search may be completed by analyzing a preselected set of websites that are known to sell the product. Alternatively, an internet search of the product may be used to find current sales prices of the product on existing websites using, for example, a model name, a manufacturer name, and/or a stock-keeping unit number (SKU). Other product properties may also be used during the search. In some embodiments, the lowest credible price may be entered by a system administrator, a buyer, or a seller. Any prices entered for a product are then compared to previously entered prices and/or prices previously obtained via a search in order to determine the lowest credible price of the product. Moreover, in some embodiments, a minimum advertised price may be obtained from a manufacturer of the product and entered as the lowest credible price. Once the lowest credible price is determined, it is stored 608 in database 108 (shown in FIGS. 1 and 2) and linked to the product ID. It should be noted that, in some embodiments, supplemental searches may be made over the Internet in order to update the lowest credible price of the product. If a lower price is found than is currently associated with the product in database 108, then the newly found lowest credible price may be stored in database 108 as the lowest credible price of the product.

Next, server system 200 determines 610 an allowable bid increment. In one embodiment, the allowable bid increment is based on the lowest credible price. For example, the allowable bid increment may be a percentage of the lowest credible price. In another embodiment, the allowable bid increment is a fixed amount, such as one dollar, or ten dollars. The allowable bid increment is then stored 612 in database 108 and associated with the product ID.

In the exemplary embodiment, the buyer then searches 614 for a product using buyer workstation 218. For example, the buyer may navigate to a web page hosted by web server 204. After logging in, as described above, the buyer may use a number of filtering tools to find a desired product. Such tools may include drop down lists, radio-style buttons, text search fields, and other known search and/or filtering tools. In some embodiments, the buyer may start with a broad category, such as televisions, and use the filtering tools to narrow the results to, for example, a desired manufacturer. The buyer may then again use the filtering tools to narrow the results to, for example, a desired size, model, or the like. Once the buyer finds the desired product, the buyer displays the product information entered as described above.

Figure 7B:
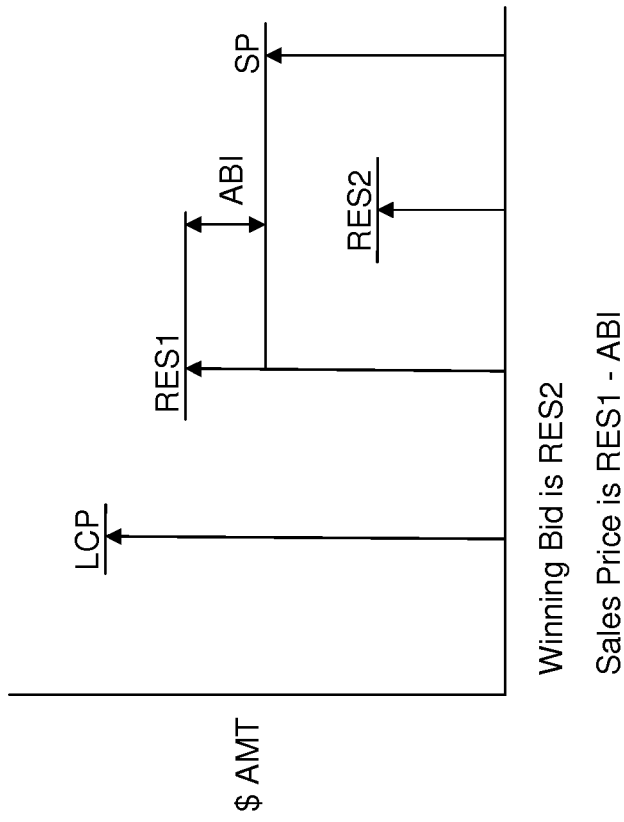
FIGS. 7A and 7B are graphs illustrating a comparison between a lowest credible price and one or more reserve prices received from sellers.
Figure 7A:
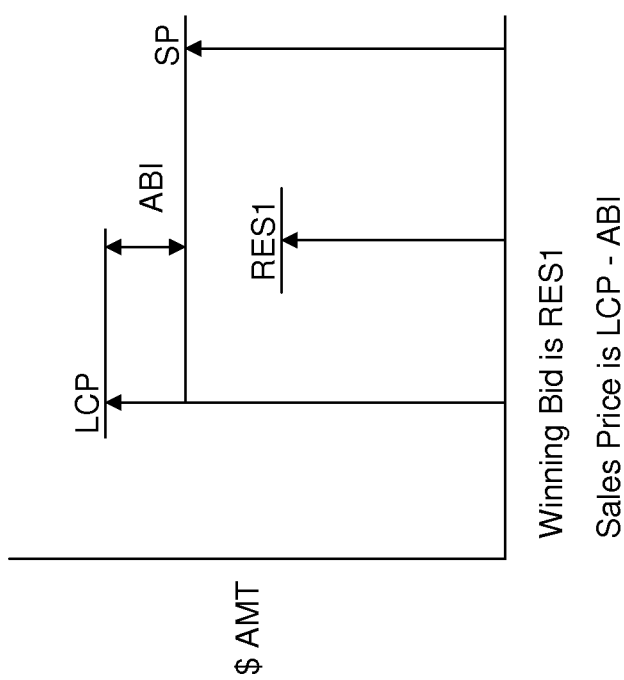

After reserve prices, the lowest credible price, and the allowable bid increment associated with the product have been stored in database 108, system 200 determines 616 the sales price and stores 618 the sales price in database 108. In the exemplary embodiment, server system 102 compares each reserve price associated with the product ID in database 108. Server system 102 also compares each reserve price to the lowest credible price that is associated with the product ID in database 108. After the comparisons between each reserve price and between each reserve price and the lowest credible price are completed, server system 102 determines the sales price. More specifically, each time a buyer displays the product information, server system 102 re-determines the sales price. For example, FIG. 7A is a graph that illustrates the sales price SP in a situation in which one reserve price RES1 is less than the lowest credible price LCP. In such a situation, lowest credible price LCP is reduced by the allowable bid increment ABI, and the sales price SP is set to this value. The sales price SP is then stored in database 108 and associated with the product ID. As such, the lowest reserve price RES1 is the winning bid. A second example, shown in FIG. 7B, illustrates the sales price SP in a situation in which multiple reserve prices RES1 and RES2 are less than the lowest credible price LCP. In such a situation, the second lowest reserve price RES1 is reduced by the allowable bid increment ABI, and the sales price SP is set to this value. The sales price SP is then stored in database 108 and associated with the product ID. As such, the lowest reserve price RES2 is the winning bid. In some embodiments, if no reserve prices stored in database 108 are less than the lowest credible price, server system 102 sets the sales price either equal to the lowest credible price or equal to the lowest credible price less the allowable bid increment.

Figure 8B:
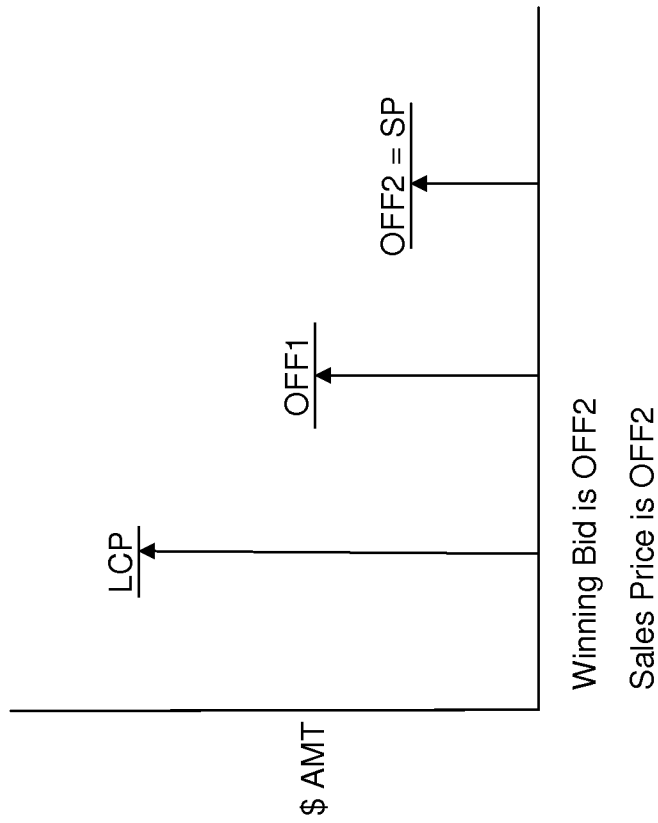
FIGS. 8A and 8B are graphs illustrating a comparison between a lowest credible price and one or more offers to sell received from sellers.
Figure 8A:
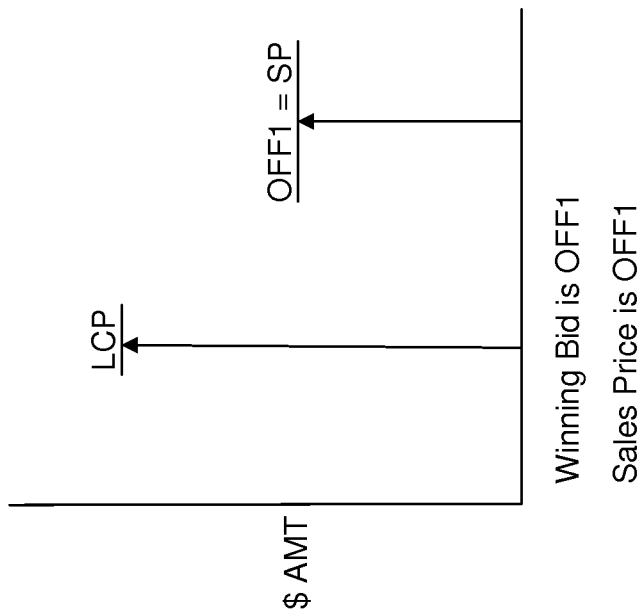

In an alternative embodiment, and when sellers submit offers for sale rather than reserve prices, server system 102 compares each offer associated with the product ID in database 108. Server system 102 also compares each offer to the lowest credible price that is associated with the product ID in database 108. After the comparisons are completed, server system 102 determines the sales price. For example, FIG. 8A is a graph that illustrates the sales price SP in a situation in which one offer OFF1 is less than the lowest credible price LCP. In such a situation, the sales price SP is set equal to the offer OFF1. The sales price SP is then stored in database 108 and associated with the product ID. As such, the lowest offer OFF1 is the winning bid. A second example, shown in FIG. 8B, illustrates the sales price SP in a situation in which multiple offers OFF1 and OFF2 are less than the lowest credible price LCP. Similar to the situation shown in FIG. 8A, the sales price SP is set equal to the lowest offer, here OFF2. The sales price SP is then stored in database 108 and associated with the product ID. As such, the lowest offer OFF2 is the winning bid. In some embodiments, if no offers stored in database 108 are less than the lowest credible price, server system 102 sets the sales price either equal to the lowest credible price or equal to the lowest credible price less the allowable bid increment.

In another alternative embodiment, and when each seller submits either an offer to sell or a reserve price, server system 102 compares each reserve price and each offer associated with the product ID in database 108. Server system 102 also compares each reserve price and each offer to the lowest credible price that is associated with the product ID in database 108. After the comparisons are completed, server system 102 determines the sales price. For example, FIG. 9A is a graph that illustrates the sales price SP in a situation in which one reserve price RES is less than the lowest credible price LCP and any offer OFF. In such a situation, the lowest offer OFF is reduced by the allowable bid increment ABI, and the sales price SP is set to this value. The sales price SP is then stored in database 108 and associated with the product ID. As such, the lowest reserve price RES is the winning bid. It should be noted with regards to FIG. 9A that if the reserve price RES is lower than the lowest credible price LCP and, if the next lowest bid is a reserve price, the situation is handled as shown in FIG. 7B and described above. A second example, shown in FIG. 9B, illustrates the sales price SP in a situation in which at least one reserve price RES and at least one offer OFF are less than the lowest credible price LCP. Similar to the situation shown in FIG. 8B, the sales price SP is set equal to the lowest offer, here OFF. The sales price SP is then stored in database 108 and associated with the product ID. As such, the lowest offer OFF is the winning bid. In some embodiments, if no offers or reserve prices stored in database 108 are less than the lowest credible price, server system 102 sets the sales price either equal to the lowest credible price or equal to the lowest credible price less the allowable bid increment.

In another alternative embodiment, server system 102 determines the sales price by, for example, randomly selecting a sales price from the offers for sale and/or reserve prices that are associated with the product in database 108.

Server system 102 then queries database 108 to obtain the sales price determined as described above. The product information and sales price are then displayed 620 to the buyer. In the exemplary embodiment, the identity of the seller is not displayed to the buyer. However, alternative embodiments may display the seller identity and/or contact information for the seller. Moreover, in one embodiment, the sales price of the product is not displayed but, rather, the buyer is prompted to request the sales price from system 200. In such an embodiment, the buyer may, for example, send an email to mail server 210, request a phone call from an administrator of system 200, or request an email from email server 210 in order to request the sales price.

After obtaining the sales price from server system 102, the buyer decides 622 whether to accept the sales price. If the buyer chooses not to purchase the product at the sales price, the buyer may then create 624 a watch list. For example, the buyer may set time to buy reminder that includes a time window, such as thirty days or ninety days, wherein server system 102 reminds the buyer at the end of the time window of the possible purchase. The buyer may then decide to purchase the product. Alternatively, the buyer may set a time to buy reminder that automatically purchases the product at the end of a time window. As another example, the buyer may set a price alert that includes a desired price such that server system 102 notifies the buyer that the sales price of the product has reached the buyer's desired price. The desired price may also be a range. For example, server system 102 may notify the buyer when the sales price of the product is between a first designated price and a second designated price. In addition, the buyer may use a combination of a time to buy reminder and a watch list. For example, the buyer may set up a watch list such that server system 102 notifies the buyer if the sales price of the product reaches a desired price or price range within a designated time window. Reminders and/or notifiers sent to the buyer may be in the form of an email, a phone call, a fax, a text message, an instant message, and/or any other suitable form of communication.

When the buyer accepts the sales price, the buyer then submits 626 a payment to system 200. In some embodiments, the payment may be submitted electronically using, for example, a credit card, a debit card, or the like. Moreover, in some embodiments, the payment may be submitted by enabling system 200 to withdraw the sales price directly from the buyer's bank account. Further, in some embodiments, the buyer may submit a check or money order via normal mail, to be delivered to an administrator of system 200. In the exemplary embodiment, once system 200 has received payment, system 200, such as server system 102, orders 628 the product from the seller having the winning bid, as described above. System 200 may place the order electronically using, for example, a seller website. Alternatively, system 200 may place the order using, for example, email, a phone order placed by an administrator, a fax order placed by an administrator, or the like. In addition, system 200 submits 630 the payment received from the buyer to the seller. In some embodiments, server system 102 may deduct a transaction fee from the payment received from the buyer prior to submitting the remainder to the seller. Moreover, in some embodiments, server system 102 may divide the payment into multiple portions, and transmit each portion to a designated party. For example, server system 102 may receive a payment from a buyer for a product that is being sold by a seller that does not maintain an inventory and, instead, contracts with a distributor or wholesaler to ship or drop ship sold product. In such a situation, server system 102 may divide the received payment into a system transaction fee, a seller fee, and a distributor fee. The transaction fee is an amount charged by system 200 for supplying the exchange environment and contact with potential buyers. The seller fee is an amount earned by the seller for the sale of the product to the buyer, and the distributor fee is an amount earned by the distributor for maintaining the seller's inventory and shipping the product to the buyer. The various fee amounts may be predetermined flat amounts or may be based on the sales price of the product.

The seller processes the order and then ships 632 or drop ships the product to the buyer using the buyer information submitted during registration with system 200. In some embodiments, the seller may instead ship the product to an administrator of system 200, who then ships the product to the buyer. Alternatively, the seller may arrange for a wholesaler, a distributor, or the seller's supplier to ship the product to the buyer. In some embodiments, if the product arrives damaged at the buyer, the buyer may return the product to an administrator of system 200. Alternatively, the buyer may return the product to the seller. Similarly, during a warranty period, the buyer may coordinate a return or repair of the product with system 200, or may coordinate directly with the seller.

Moreover, in some embodiments, when the seller sells an entire quantity of the product that has been stocked, system 200 re-determines the sales price as described above. As such, although a particular seller may not enter a winning bid during an initial evaluation and determination of the sales price, the seller's bid may be determined to be the winning bid at a later time.

Furthermore, in some embodiments, each seller may change a bid previously entered into system 200. For example, a seller may modify a respective bid in order to reduce an offer to sell or a reserve price that was entered by the seller. Server system 102 will automatically re-determine the sales price using the reduced offer to sell or reserve price. Alternatively, in some embodiments, a seller may enable server system 102 to automatically reduce an offer to sell that was previously entered by the seller. Server system 102 will automatically re-determine the sales price using the reduced offer to sell.

Figure 10:
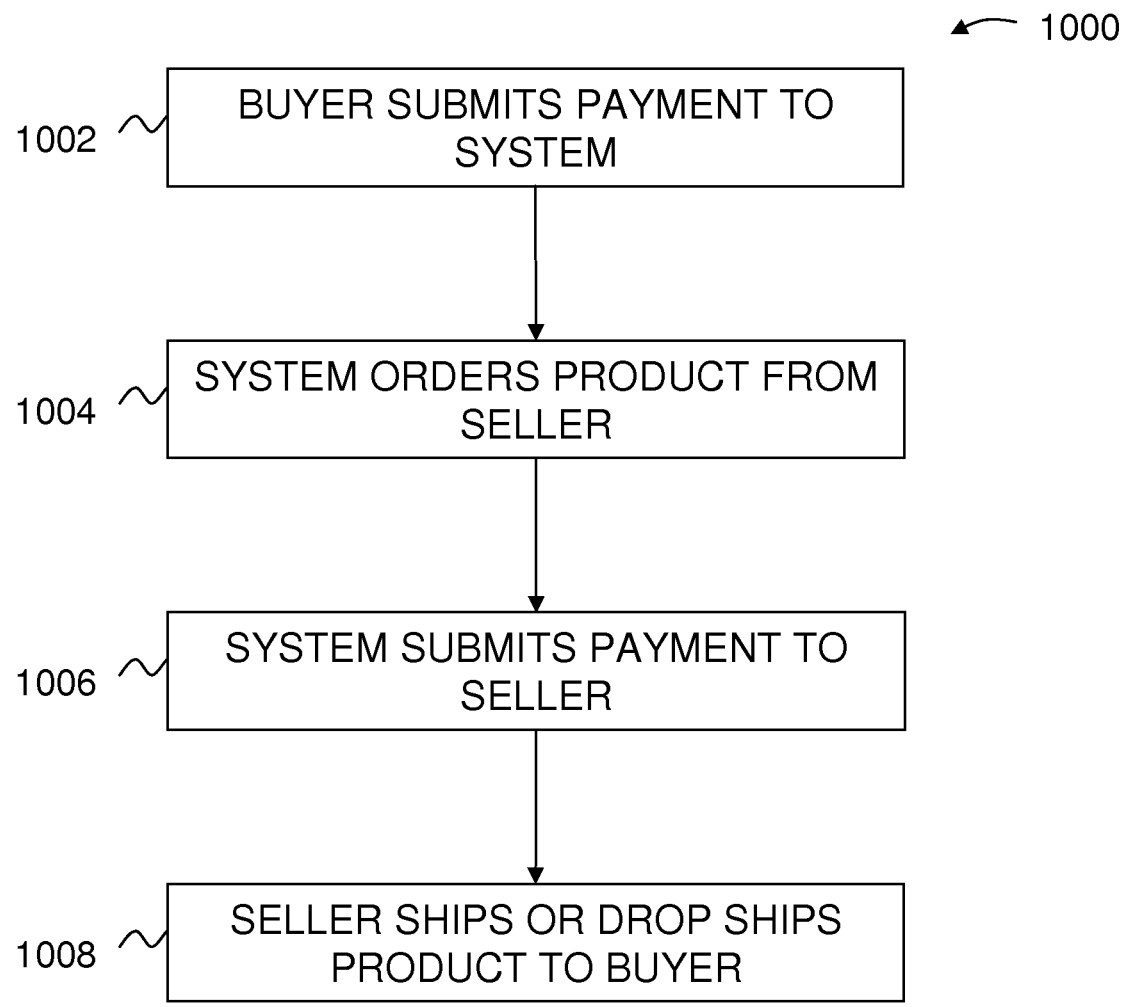
FIG. 10 is a flowchart illustrating a method of operating as a shipping agent between a buyer and a seller using the online system shown in FIG. 2.

FIG. 10 is a flowchart 1000 illustrating a method of operating as a shipping agent between a buyer and a seller using an online system, such as system 200 (shown in FIG. 2). In the exemplary embodiment, a buyer submits 1002 payment for a product to system 200. In some embodiments, the payment may be submitted electronically using, for example, a credit card, a debit card, or the like. Moreover, in some embodiments, the payment may be submitted by enabling system 200 to withdraw the sales price directly from the buyer's bank account. Further, in some embodiments, the buyer may submit a check or money order via normal mail, to be delivered to an administrator of system 200. In the exemplary embodiment, once system 200 has received payment, system 200 orders 1004 the product from the seller. System 200 may place the order electronically using, for example, a seller website. Alternatively, system 200 may place the order using, for example, email, a phone order placed by an administrator, a fax order placed by an administrator, or the like. In addition, system 200 submits 1006 payment for the product, as received by from the buyer. The seller processes the order and then ships 1008, such as drop ships, the product to the buyer using the buyer information submitted during registration with system 200. In some embodiments, the seller may instead ship the product to an administrator of system 200, who then ships the product to the buyer. In some embodiments, if the product arrives damaged at the buyer, the buyer may return the product to an administrator of system 200. Alternatively, the buyer may return the product to the seller. Similarly, during a warranty period, the buyer may coordinate a return or repair of the product with system 200, or may coordinate directly with the seller.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. A method of operating an online dynamic-bidding exchange for use in a reverse auction, the exchange including a server system that includes a database, and a client system coupled to the server system via a communications network, said method comprising:

the server system performing a search over the network and determining a lowest credible price of a product available from one of a plurality of online vendors;

receiving, by the server system, an offer to sell the product from a seller via the communications network and storing the offer to sell in the database, the offer to sell embodied as a reserve price, wherein an identity of the seller is anonymous and is not displayed to a buyer;

associating, within the database, the product with the reserve price and the lowest credible price;

receiving, by the server system, a selection of the product from the buyer through the client system after the product is associated with the reserve price and the lowest credible price;

determining, by the server system, a sales price of the product comprising:
 comparing the lowest credible price to the reserve price; and
 setting the sales price to a value that is greater than the reserve price and less than or equal to the lowest credible price upon a determination that the reserve price is less than the lowest credible price and setting the sales price equal to the lowest credible price upon a determination that the reserve price is greater than or equal to the lowest credible price;

transmitting the sales price from the server system to the client system; and displaying the sales price to the buyer via the client system.

2. A method in accordance with claim 1, wherein using the server system to perform a search to determine a lowest credible price of a product comprises repeatedly performing the search over the communications network to determine the lowest credible price of the product.

3. A method in accordance with claim 1, wherein determining the lowest credible price comprises receiving the lowest credible price from the client system.

4. A method in accordance with claim 1, further comprising determining an allowable bid increment.

5. A method in accordance with claim 4, wherein determining a sales price further comprises:
 reducing the lowest credible price by the allowable bid increment; and
 setting the sales price equal to the reduced lowest credible price upon a determination that the reserve price is greater than the reduced lowest credible price.

6. A method in accordance with claim 4, wherein the seller is a first seller of a plurality of sellers and the offer to sell is a first offer to sell of a plurality of offers to sell, the first offer to sell embodied as a first reserve price, wherein receiving an offer to sell comprises receiving the plurality of offers to sell from a plurality of sellers, each offer to sell embodied by a reserve price.

7. A method in accordance with claim 6, wherein determining a sales price comprises comparing the reserve prices to the lowest credible price, and comparing the reserve prices to each other.

8. A method in accordance with claim 7, wherein determining a sales price further comprises:
 determining that the first reserve price and a second reserve price of the plurality of reserve prices are less than the lowest credible price and that the second reserve price is higher than the first reserve price;
 reducing the second reserve price by the allowable bid increment; and
 setting the sales price equal to the reduced second reserve price upon a determination that the reduced second reserve price is greater than the first reserve price.

9. A method in accordance with claim 7, wherein determining a sales price further comprises setting the sales price equal to the lowest credible price upon a determination that at least one of the reserve prices is equal to the lowest credible price.

10. A method in accordance with claim 7, wherein determining a sales price further comprises:
 reducing the lowest credible price by the allowable bid increment; and
 setting the sales price equal to the reduced lowest credible price upon a determination that the reduced lowest credible price is greater than the first reserve price.

11. A method in accordance with claim 6, wherein receiving a plurality of offers to sell comprises:
 comparing the reserve prices to each other;
 determining that a reserve price from a respective seller is equal to a preexisting reserve price received from any of the plurality of sellers; and
 requesting a replacement reserve price from the respective seller.

12. A method in accordance with claim 1, further comprising receiving a payment equal to the sales price from the customer, and transmitting an order for the product to the seller for delivery to the customer.

13. A method of operating an online dynamic-bidding exchange for use in a reverse auction, the exchange including a server system that includes a database, and a client system coupled to the server system via a communications network, said method comprising:
 determining a lowest credible price of a product;
 receiving, by the server system, a plurality of anonymous offers to sell the product from a plurality of sellers via the communications network, each offer to sell embodied as a respective reserve price;
 storing the reserve prices in the database using the server system;
 comparing the reserve prices to the lowest credible price;
 associating, within the database, the product with the reserve prices;
 receiving, by the server system, a selection of the product from the buyer through the client system after the product is associated with the reserve prices;
 determining, by the server system, a sales price of the product comprising:
  comparing the reserve prices to each other; and
  setting the sales price to a value that is between a lowest reserve price and a second lowest reserve price of the reserve prices and less than or equal to the lowest credible price, upon a determination that the lowest reserve price is less than the lowest credible price and setting the sales price equal to the lowest credible price upon a determination that the lowest reserve price is greater than or equal to the lowest credible price; and
 displaying the sales price to a buyer via the client system such that an identity of any of the plurality of sellers is not displayed to the buyer.

14. A method in accordance with claim 13, further comprising determining, by the server system, an allowable bid increment.

15. A method in accordance with claim 14, wherein determining a sales price further comprises:
 reducing the second lowest reserve price by the allowable bid increment; and
 setting the sales price equal to the reduced second lowest reserve price upon a determination that the reduced second lowest reserve price is greater than the lowest reserve price.

16. A method of operating an online dynamic-bidding exchange for use in a reverse auction, the exchange including a server system that includes a database, and a client system coupled to the server system via a communications network, said method comprising:

determining a lowest credible price of a product;

storing the lowest credible price in the database using the server system;

receiving a plurality of offers to sell the product from a plurality of sellers via the communications network, each offer to sell embodied as a reserve price;

storing the reserve prices in the database using the server system;

associating, within the database, the product with the reserve prices and the lowest credible price;

receiving, by the server system, a selection of the product from the buyer through the client system after the product is associated with the reserve prices and the lowest credible price;

determining, using the server system, a sales price of the product comprising:

comparing the reserve prices to each other to determine a lowest reserve price;

comparing the reserve prices to the lowest credible price; and setting the sales price to a value that is greater than the lowest reserve price and less than or equal to the lowest credible price upon a determination that the lowest reserve price is less than the lowest credible price and setting the sales price equal to the lowest credible price upon a determination that the lowest reserve price is greater than or equal to the lowest credible price; and transmitting the sales price to the client system by the server system responsive to a request for a price of the product.

17. An online dynamic-bidding exchange for use in a reverse auction, said exchange comprising:

a client system;

a database for storing information; and a server system coupled to said client system and said database via a communications network, said server system configured to:

perform a search over said communications network and to determine a lowest credible price of a product available from one of a plurality of online vendors;

receive a plurality of anonymous offers to sell the product from a plurality of sellers via said communications network, each offer to sell embodied as a reserve price;

associate the product with the reserve prices and the lowest credible price;

receive a selection of the product from the buyer through said client system after the product is associated with the reserve prices and the lowest credible price;

compare the reserve prices to each other to determine a lowest reserve price;

compare the lowest credible price and the reserve prices;

set a sales price of the product to a value that is greater than the lowest reserve price and less than or equal to the lowest credible price upon a determination that the lowest reserve price is less than the lowest credible price and setting the sales price equal to the lowest credible price upon a determination that the lowest reserve price is greater than or equal to the lowest credible price; and transmit the sales price to said client system for display to a customer such that an identity of any of the plurality of sellers is not displayed.

18. An exchange in accordance with claim 17, wherein said server system is configured to repeatedly perform the search over said communications network to determine the lowest credible price of the product.

19. An exchange in accordance with claim 17, wherein said communications network comprises the Internet.

20. An exchange in accordance with claim 17, wherein said server system is configured to receive the lowest credible price from said client system.

21. An exchange in accordance with claim 17, wherein said server system is configured to:

determine that one reserve price is less than or equal to the lowest credible price; and set the sales price equal to the lowest credible price.

22. An exchange in accordance with claim 17, wherein said server system is configured to determine an allowable bid increment.

23. An exchange in accordance with claim 22, wherein said server system is configured to:

compare each reserve price to the lowest credible price;

reduce the lowest credible price by the allowable bid increment; and set the sales price equal to the reduced lowest credible price upon a determination that each reserve price is greater than the lowest credible price.

24. An exchange in accordance with claim 22, wherein said server system is configured to:

determine that the lowest reserve price and a second lowest reserve price are less than or equal to the lowest credible price;

reduce the second lowest reserve price by the allowable bid increment; and set the sales price equal to the reduced second lowest reserve price upon a determination that the reduced second lowest reserve price is greater than the lowest reserve price.

25. An exchange in accordance with claim 22, wherein said server system is configured to:

reduce the lowest credible price by the allowable bid increment; and set the sales price equal to the reduced lowest credible price upon a determination that the reduced lowest credible price is greater than the lowest reserve price.

26. An exchange in accordance with claim 17, wherein said server system is configured to:

determine that a reserve price from a respective seller is equal to a preexisting reserve price received from any of the plurality of sellers; and request a replacement reserve price from the respective seller.

27. An exchange in accordance with claim 17, wherein said server system is configured to receive a payment equal to the sales price from the customer, and transmit an order for the product to the seller for delivery to the customer.

28. An online dynamic-bidding exchange for use in a reverse auction, said exchange comprising:

a client system;

a database for storing information; and a server system coupled to said client system and said database via a communications network, said server system configured to:

determine a lowest credible price of a product;

receive a plurality of offers to sell the product from a plurality of sellers via said communications network, each offer to sell embodied as a reserve price;

associate, within said database, the product with the reserve prices and the lowest credible price;

receive a selection of the product from the buyer through said client system after the product is associated with the reserve prices and the lowest credible price;

compare the reserve prices to each other to determine a lowest reserve price;

compare the reserve prices to the lowest credible price;

set the sales price to a value that is greater than the lowest reserve price and less than or equal to the lowest credible price upon a determination that the lowest reserve price is less than the lowest credible price and setting the sales price equal to the lowest credible price upon a determination that the lowest reserve price is greater than or equal to the lowest credible price; and transmit the sales price to said client system.

* * * * *